United States Patent [19]
McNutt

[11] Patent Number: 6,022,206
[45] Date of Patent: Feb. 8, 2000

[54] CUBIC MULTI ANVIL DEVICE

[76] Inventor: Peter D. McNutt, 16 Tomkins Ave., W. Nyack, N.Y. 10994

[21] Appl. No.: 09/046,921

[22] Filed: Mar. 24, 1998

Related U.S. Application Data

[60] Provisional application No. 60/042,420, Mar. 27, 1997.

[51] Int. Cl.[7] .................................................. B29C 43/02
[52] U.S. Cl. ............................................ 425/77; 425/330
[58] Field of Search .............................. 425/77, 330, 352, 425/356

[56] References Cited

U.S. PATENT DOCUMENTS

| | | | |
|---|---|---|---|
| 3,384,926 | 5/1968 | Tsujii ......................................... | 425/77 |
| 3,517,413 | 6/1970 | Takahashi et al. ......................... | 425/77 |
| 3,574,580 | 4/1971 | Stromberg et al. ........................ | 425/77 |
| 3,895,894 | 7/1975 | Biermann et al. ......................... | 425/77 |
| 3,914,078 | 10/1975 | Kendall ..................................... | 425/77 |
| 4,003,697 | 1/1977 | Elmgren .................................... | 425/77 |
| 4,113,846 | 9/1978 | Sigurdsson ................................ | 425/77 |

OTHER PUBLICATIONS

Journal of Geophysical Research—vol. 65, No. 2–Feb. 1960—Apparatus for Phase–Equilibrium Measurements at Pressures up to 50 Kilobars and Temperatures up to 1750C–F.R. Boyd and J.L. England—pp. 741–748.

American Mineralogist, vol. 76, pp. 1020–1028, 1990—"Some simplifications to multianvil devices for high pressure experiments"—D. Walker,* M.A. Carpenter, C.M. Hitch.

American Mineralogist, vol. 76, pp. 1092–1100, 1991—"Lubrication, gasketing, and precision in multianvil experiments"—David Walker.

*Primary Examiner*—Harold Pyon
*Assistant Examiner*—Mah A. Wentink
*Attorney, Agent, or Firm*—Anthony J. Casella; Gerald E. Hespos

[57] ABSTRACT

A multi anvil device is provided for creating substantially hydrostatic pressure conditions on a cubic sample vessel having a. volume of up to approximately one cubic centimeter. The device comprises a plurality of pressure members disposed within a tubular locking ring. The pressing members collectively define a right cylinder form having a hollow cuboidal center, and the members are formed to cooperatively reduce the volume of the hollow center under compression of the device. Two generally disc-shaped end plates are disposed at the ends of the device to receive and transmit forces from an external source to the pressing members. The pressing members and the locking ring are unconstrained and reactive to misalignment of forces applied to the device and misalignment of the components within the device. A zirconia cubic sample vessel having chamfered edges is also provided for encompassing the sample during operation of the device. Lanthanum chromite is disposed within the sample vessel as a heating medium which is reactive to an electrical charge.

21 Claims, 4 Drawing Sheets

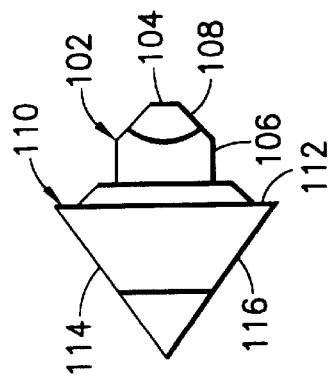
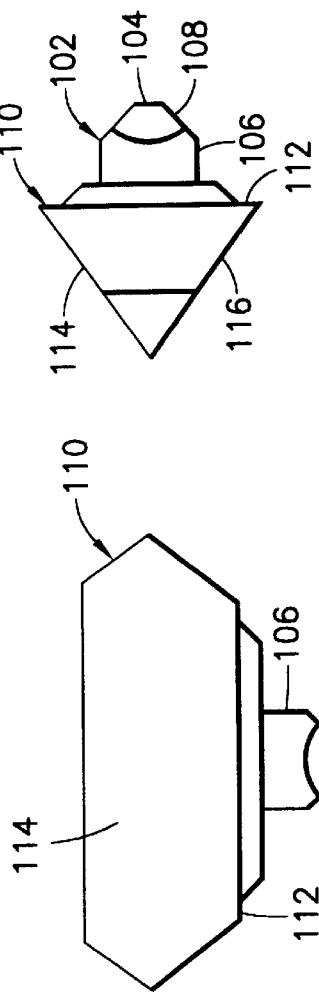
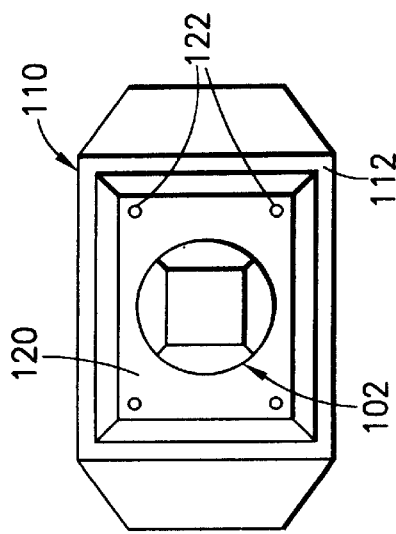
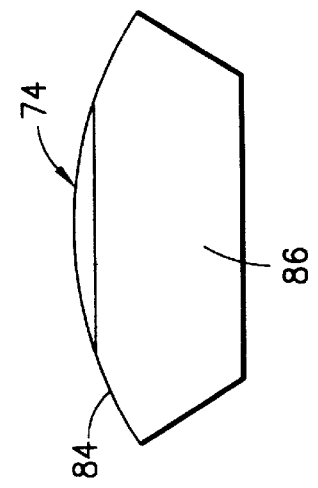
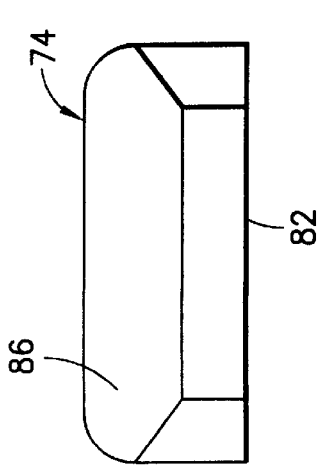

CUBIC MULTI ANVIL DEVICE

This application claims the benefit of Provisional Application No. 60/042,420 filed Mar. 27, 1997.

BACKGROUND OF THE INVENTION

This invention relates to multi anvil devices and, more particularly, to cubic multi anvil devices.

Devices for generating high pressure and high temperature conditions have been developed in the prior art to meet research and industrial needs. Geophysical and petrological research require apparatuses which are capable of simulating sub-surface conditions of the Earth, including simultaneously generated high pressure and high temperature conditions. Likewise, industrial production of diamonds also requires apparatuses capable of simultaneously generating high pressure and high temperature conditions. To this end, various multi anvil apparatuses have been developed in the prior art which are capable of generating substantially hydrostatic pressure conditions on a sample, while heating the sample. The apparatuses typically consist of variously shaped cooperating members assembled to receive externally applied forces, such as from a hydraulic press or a pressure ram, and convert the forces to substantially hydrostatic pressure acting on a centrally located polyhedral sample vessel, which accommodates the sample. Sample vessels have been formed with many shapes including cubic, tetrahedral and octahedral. In all of the prior art apparatuses, the cooperating members of the devices are formed to engage each face of the sample vessel in face-to-face engagement and press thereupon, such that the cumulative affect of pressing all the faces of the sample vessel results in volume reduction of the sample vessel and pressure being applied to the sample enclosed within the vessel. Pressure conditions at the sample vessel are substantially hydrostatic with the pressure acting on each face of the sample vessel being substantially equal as if the pressure was generated under hydrostatic conditions, rather than solid state.

Since volume reduction of the sample vessel is desired, the sample vessel must be formed from a deformable material. Under pressure applied by a multi anvil device, the sample vessel will deform with the material making up the sample vessel being extruded into clearances defined between the pressure-applying members of the device. Limited extrusion of the sample vessel material is desired to achieve two purposes. First, the extruded material acts as gaskets about the sample vessel which limit the amount of sample vessel material which is actually extruded. As pressure is applied to the sample vessel, increasing amounts of the material are extruded until the shear strength of the material resists further extrusion. Material with insufficient shear strength will not provide the gasket functions described above. If excessive material is extruded between the pressure-applying members, the extruded material will absorb the pressure exerted by the pressure-applying members, and little or no pressure will be applied to the sample vessel. Consequently, no work is performed on the sample vessel.

A second function of the extruded material is to provide massive support for the members applying pressure to the sample vessel. Typically, tungsten carbide is used in forming the pressure-applying members which press against the sample vessel. Many prior art apparatuses generate pressure conditions at the pressure-applying members which are greatly in excess of the compressive strength of tungsten carbide. The extruded sample vessel material acts as supportive gaskets between the various tungsten carbide pressure-applying members. With prior art apparatuses which operate above the compressive strength of tungsten carbide, the extruded sample vessel material provides support about the pressure-applying members which prevents the tungsten carbide from failing during operation.

Castable ceramics have been used in the prior art to form sample vessels, including MgO based materials, $Al_2O_3$ based materials, $SiO_2$ based materials, and Zircon-MgO (zirconia) based materials. Prior art sample vessels have been formed with peripherally extending gaskets, which resemble fins, and which are disposed in between the pressure-applying members. Frictional forces are generated between the fins and the pressure-applying members which limit the extrusion of the sample vessel materials to amounts less than that which is extruded with a comparable "finless" design.

Prior art cubic multi anvil devices suffer from several drawbacks. First, the apparatuses are formed with two spaced one-piece end plates which each have planar outer surfaces in face-to-face engagement with components of the external pressure source. The inner face of each of the end plates is configured with various inwardly extending, angled surfaces which are intended to angularly engage individual pressure receiving members disposed between the end plates and urge the pressure receiving members inwardly to apply pressure horizontally on the sample vessel. Simultaneously, the end plates directly apply pressure to the opposing vertical faces of the cubic sample vessel, and, consequently, pressure is applied to all six faces of the cubic sample vessel. The unitary construction of the end plates, however, is susceptible to high stress concentrations at central portions thereof due to the combined effect of directly transmitting pressure to the respective vertical face of the cubic sample vessel and urging the pressure receiving members horizontally inwardly towards the cubic sample vessel. The high stress concentrations prevent prior art apparatuses from achieving higher working pressures. A second drawback of the prior art apparatuses is the accommodation of limited volumes of sample material. Typical prior art apparatuses are able to accommodate sample volumes on the order of tens of cubic millimeters. However, research institutions and commercial facilities require the accommodation of larger samples.

It is an object of the subject invention to provide a multi anvil device for use with a cubic sample vessel which overcomes the shortcomings of the prior art.

It is also an object of the subject invention to provide a zirconia cubic sample vessel with lanthanum chromite disposed therein for reaction to an electrical flow and the heating of an enclosed sample material.

It is a further object of the subject invention to provide a multi anvil device comprised of unconstrained pressing members.

It is yet another object of the subject invention to provide a multi anvil device encompassed by an axially unconstrained locking ring which is reactive to the misalignment of forces applied to the multi anvil device.

It is still yet another object of the subject invention to provide a multi anvil device formed with a plurality of cooperating members which collectively define a right cylindrical form with a central hollow cuboidal space for accommodation of a cubic sample vessel.

SUMMARY OF THE INVENTION

The above-stated objects are met by a cubic multi anvil device including two parallel end plates, an axially unconstrained tubular locking ring, a plurality of unconstrained pressing members and a cubic sample vessel. The device is intended for use with an external source of uniaxial force, such as a hydraulic press, with the device being disposed between two spaced substantially planar pressure plates of the external uniaxial force source.

The end plates are each generally disc-shaped with one planar surface being in face-to-face engagement with a single of the pressure plates. A cylindrical portion extends from the second planar surface of each of the end plates towards the opposing end plate. The tubular locking ring longitudinally extends between the end plates and is formed with an inner surface cross-sectionally having a constant diameter which is slightly greater than the diameter of the cylindrical portions of the end plates. Accordingly, the cylindrical portions of the end plates can telescopically mate with the inner surface of the locking ring, as described below. Also, with the device and external force source being generally vertically aligned, the locking ring rests on an elastomeric O-ring which is secured to the lower end plate. In this manner, the locking ring is axially spaced from the lower end plate. The device is also formed to have the locking ring axially spaced from the upper end plate. With axial freedom, the locking ring is unconstrained by the end plates, and may shift during use of the multi anvil device.

A plurality of unconstrained pressing members is disposed between the end plates and within the locking ring. The term "unconstrained", as used herein, means the motion of the respective component is not restricted to one degree of freedom. Thus, an unconstrained component is capable of reacting to misalignment of the component itself or the force being applied thereto and shift substantially into proper alignment.

The plurality of pressing members includes a plurality of pressure transmitting members and a plurality of pressure receiving members. There is a plurality of pressure transmitting members in pressing contact with each of the end plates. Since the pressure transmitting members may move axially or radially relative to the respective adjacent end plate, shear stresses are not developed at the respective inner surfaces of the end plates. Consequently, the combination of individual pressure transmitting members and the disc-shaped end plates avoids the substantial stress concentrations which developed in the end plates of the prior art multi anvil devices. As used herein, "pressing contact" means direct or indirect contact between at least two members which allows for direct application and transfer of force and pressure between the members, wherein the members are in abutting contact or separated by a friction reducing medium.

There are eight peripheral pressure transmitting members with each being formed with a planar first surface and a curved second surface generally perpendicular to the first surface. The curvature of each of the second surfaces substantially corresponds to the curvature of the inner surface of the locking ring. Four of the peripheral pressure transmitting members are disposed within the locking ring adjacent each of the end plates with the second surfaces being in pressing contact with the inner surface of the locking ring and the first surfaces being in pressing contact with the respective adjacent end plate. Each of the peripheral pressure transmitting members is also formed with a pressure transmitting surface which is spaced from the first surface and angularly disposed to be generally facing the center of the device. Centrally located between each set of the peripheral pressure transmitting members is a central pressure transmitting member which is formed with a generally parallelepiped shaped body, having one face in pressing contact with the respective end plate and an opposed face being directed towards the opposing pressure plate. An anvil, described below, is provided on the inwardly directed face of each of the centrally located pressure transmitting members.

Four pressure receiving members are disposed between the two sets of peripheral pressure transmitting members which are formed to receive vertically applied forces from the respective pressure transmitting members and convert it to horizontally directed forces. Each of the pressure receiving members is formed with a planar face directed towards the center of the multi anvil device and two angled pressure receiving faces extending rearwardly therefrom, which define a dihedral angle. Each pressure receiving member is disposed in the multi anvil device between a pair of peripheral pressure transmitting members with the pressure receiving faces of the respective pressure receiving member being in pressing contact with the pressure transmitting surfaces of the adjacent peripheral pressure transmitting members. The angle of pressing contact between the respective pairs of pressure receiving faces and pressure transmitting surfaces is 45° relative to the central longitudinal axis of the device.

An anvil is provided on the planar face of each of the pressure receiving members and on the inwardly directed faces of the centrally located pressure transmitting members. Preferably, the anvils are formed from tungsten carbide. The free end of each of the anvils is formed with a generally square shape substantially having the dimensions of one side of the cubic sample vessel. With the members of the device being assembled within the locking ring, the anvils are all directed inwardly such that the free ends of the anvils collectively define a cuboidal volume having substantially the dimensions of the cubic sample vessel.

In use, the cubic sample vessel is disposed centrally within the device between all of the anvils. Under force from the external force source, the cylindrical portions of the end plates telescopically mate with the inner surface of the locking ring resulting in the peripheral pressure transmitting members acting upon the pressure receiving members to urge the pressure receiving members horizontally inwardly, and the centrally located pressure transmitting members directly applying pressure to the two vertical surfaces of the sample vessel. Consequently, the six faces of the cubic sample vessel are engaged by the free ends of the anvils. Inward movement of the free ends of the anvils causes volume reduction of the cubic sample vessel and, in turn, generates pressure acting on the sample enclosed within the sample vessel.

The locking ring houses the assembled combination of pressing members and cubic sample vessel prior to and during the application of compressive forces to the device. In assembling the pressing members, clearances are provided between neighboring pressing members, except between surfaces which receive and/or exert pressure in transmitting pressure to the cubic sample vessel. With the clearances, the pressing members are unconstrained. The efficiency by which uniaxial force is converted to hydrostatic pressure by the device is a direct function of the proper alignment and positioning of the pressing members within the locking ring. With load being applied to the device, misalignment of the pressing members can be substantially corrected due to the unconstrained shifting of the pressing members into proper alignment.

Additionally, the unconstrained locking ring will allow for shifting of the entire device in response to misaligned force being applied to the device. It is intended that uniaxial force be applied to the device along an axis which is normal to the end plates. However, if the axis of the force is slightly misaligned, the end plates will shift in response to the application of the force and correspondingly the pressing members will shift. Since the locking ring is unconstrained, the locking ring will angularly shift in response to the movement of the pressing members. In this manner, collectively the end plates, the pressing members, the cubic sample vessel and the locking ring can settle into substantially perpendicular alignment with the uniaxial force being applied to the device.

The cubic sample vessel is a substantially hollow cube structurally formed from zirconia. In contrast to the prior art, no gaskets are provided about or formed integrally with the zirconia cubic sample vessel of the subject invention. Under pressure, the cubic sample vessel will have some deformation with zirconia extruding between the anvils which are applying pressure. The deformation will be limited due to the shear strength of the zirconia and the frictional engagement of the deformed zirconia with the adjacent anvils. If intermediate pressures (50–70 kBar) are applied to the cubic sample vessel, which are below the compressive strength of the tungsten carbide anvils, all edges of the cubic sample vessel may be chamfered to improve efficiency of the pressure applying process. With chamfered edges, the zirconia does not readily deform along the edges and extrude between the anvils. Consequently, with only slight deformation of the cubic sample vessel, a greater percentage of work performed by the multi anvil device of the subject invention on the cubic sample vessel is applied in actually reducing the volume of the cubic sample vessel, rather than deforming it. Since a smaller portion of the initial travel of the anvils during operation of the multi anvil device is required to deform the zirconia sample vessel and initiate actual volume reduction of the sample vessel, the subject invention may use a larger sample vessel, up to one cubic centimeter. If the zirconia sample vessel were to be used in high pressure conditions (100 kBar+) which exceed the compressive strength of tungsten carbide, fins could be provided instead of chamfered edges, as massive support for the tungsten carbide anvils.

Within the sample vessel, a hollow sample chamber is included which is at least partially encompassed by lanthanum chromite. Electrical connections are provided in contact with the lanthanum chromite to cause an electrically-resistive reaction which will provide heat to the encompassed sample chamber. Electricity is provided to the cubic sample vessel by electrically isolating the end plates and the abutting centrally located pressure transmitting member from the rest of the device, except for the cubic sample vessel. A voltage potential may be induced across the cubic sample vessel by introducing an electrical flow to one of the end plates with the rest of the device acting as an electrical ground.

The device may also be provided with a safety ring formed about the locking ring. The safety ring is formed from ductile material, which can readily deform to and trap any members or fragments of members which are expulsed radially outwardly during failure of the device or operation of the device.

Also, the multi anvil device may be formed with circular cooling rings in each of the end plates which can be independently controlled. Temperature control is often very crucial during use of the device. Cooling at various radial locations of the device provides for a certain degree of temperature control over the enclosed sample within the cubic sample vessel. The diameters of the cooling rings may be chosen to separately cool the respective central pressure transmitting members and the peripheral transmitting members. In this manner, heat sinks may be established vertically or horizontally relative to the cubic sample vessel, with control over the cooling of the vertically aligned faces of the cubic sample vessel being independent from the control of the cooling of the horizontally aligned faces of the cubic sample vessel.

These and other features of the subject invention are better understood through an examination of the following detailed description and accompanying drawings.

BRIEF DESCRIPTION OF THE DRAWINGS

FIGS. 5a–5c are views of one of the peripheral pressure transmitting members of the subject invention.

FIGS. 6a–6c are views of one of the pressure receiving members of the subject invention.

DETAILED DESCRIPTION OF THE PREFERRED EMBODIMENTS

Figure 1:
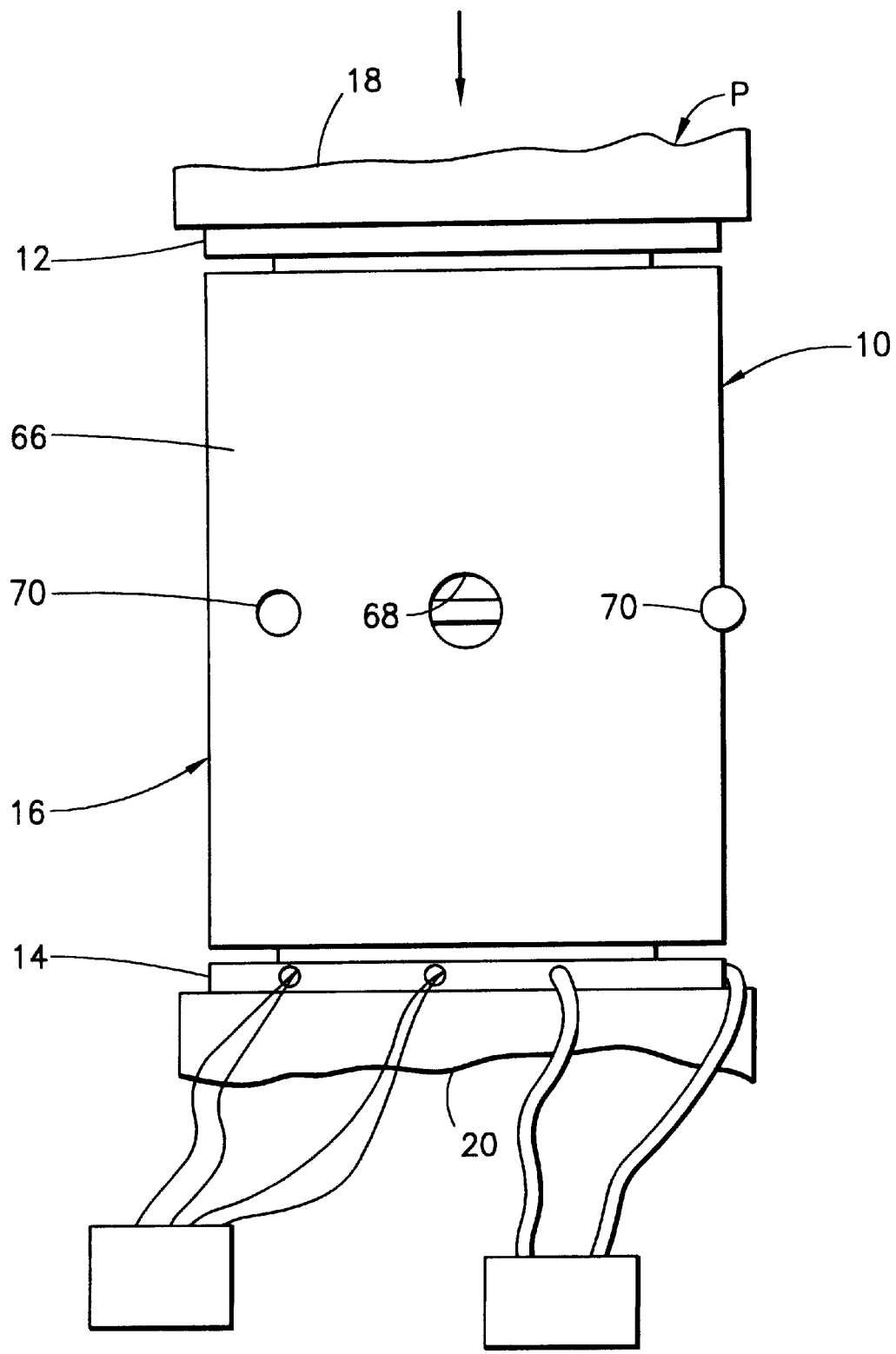
FIG. 1 is a perspective view of the device of the subject invention.
Figure 2:
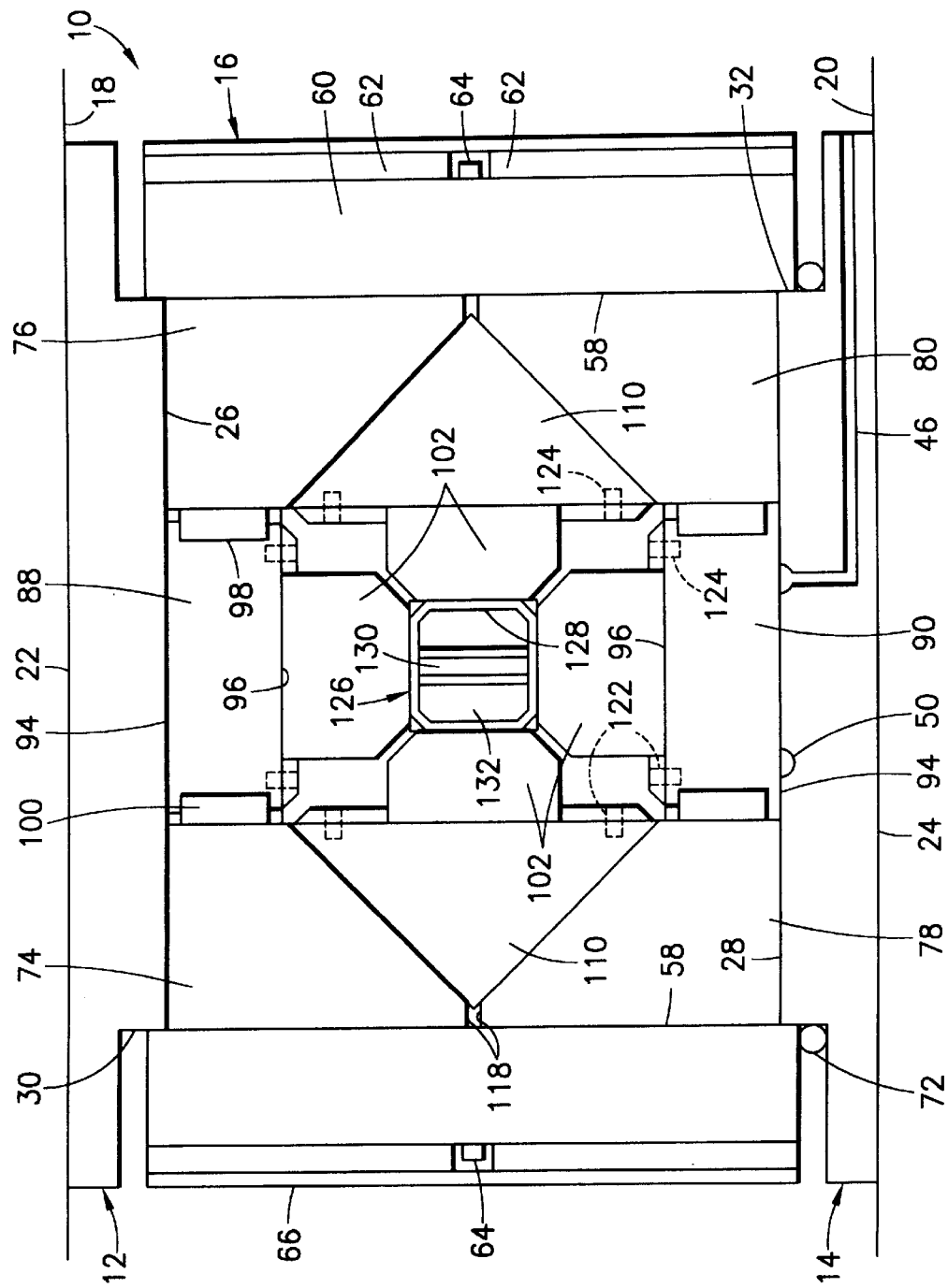
FIG. 2 is a cross-sectional view of the device of the subject invention.

Referring to FIGS. 1 and 2, a multi anvil device 10 is provided for converting uniaxial forces generated by an external source of force P, such as a hydraulic press, into substantially hydrostatic pressure conditions acting on an enclosed sample. The device 10 generally comprises two end plates 12, 14, a tubular locking ring 16 longitudinally extending between the end plates 12, 14 and a plurality of pressing members disposed between the end plates 12, 14 and within the locking ring 16. The pressing members are preferably formed from tool steel. The device 10 is placed between pressure plates 18, 20 of the external source of force P, with the pressure plates 18, 20 being configured to axially compress the device 10.

Figure 3:
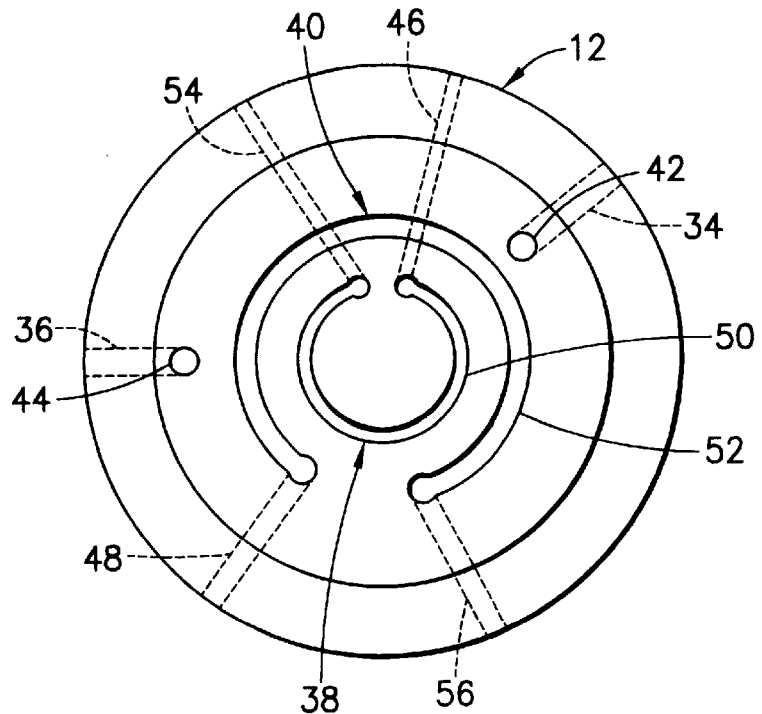
FIG. 3 is a top plan view of one of the end plates of the subject invention.
Figure 4A:
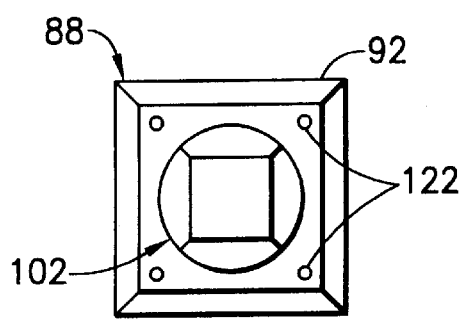
FIGS. 4a–4b are views of one of the central pressure transmitting members of the subject invention.
Figure 4B:
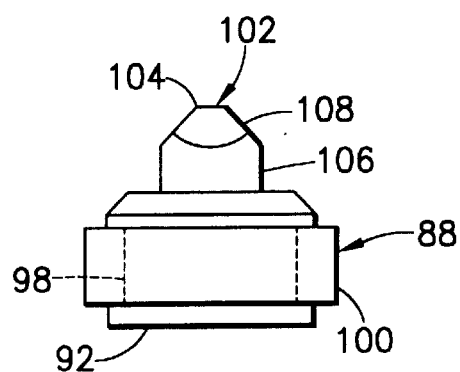

Referring to FIGS. 2 and 3, the end plates 12, 14 are generally disc shaped. Each of the end plates is formed with a planar outer surface 22, 24, respectively, which is in face-to-face engagement with the adjacent respective pressure plate 18, 20. The end plates 12, 14 are also each formed with an inner surface 26, 28, respectively, with both of the inner surfaces 26, 28 being in face-to-face alignment. The inner surfaces 26, 28 each respectively form one end of the end plates 12, 14 with a cylindrical body portion 30, 32 extending therefrom towards the respective outer surface 22, 24. The cylindrical body portions 30, 32 are formed with constant cross-sections which are dimensionally smaller than the ends formed by the respective outer surfaces 22, 24.

As shown in FIG. 3, the end plates 12, 14 may be formed with instrumentation channels 34, 36 and/or cooling systems 38, 40. Instrumentation wiring for thermocouples and other test measuring devices may have wiring passed through the instrumentation channels 34, 36 and through the apertures 42, 44 formed respectively at the ends thereof. In this manner, real time data evaluation at various internal points of the device 10 may be obtained. The cooling systems 38, 40 each respectively include a supply channel 46, 48, a circular heat exchange pathway 50, 52 and a return channel 54, 56. Heat transfer media known to those skilled in the art may be introduced to the respective supply channels 46, 48 which will pass through the heat transfer channel 50, 52 and the return channel 54, 56 in cooling portions of the device 10 in contact with the heat transfer channels 50, 52. Temperature control can be achieved through the use of the cooling systems 38, 40 at various radial locations along each of the end plates 12, 14. Preferably, the inner cooling systems 38 are dimensioned to cool the respective adjacent central pressure transmitting members, described below, and the outer cooling systems 40 are dimensioned to cool the respective adjacent peripheral pressure transmitting members, described below. In this manner, the vertically aligned faces of the sample vessel may be cooled separately from the horizontally aligned faces.

The tubular locking ring 16 is formed with an inner surface 58 which defines a constant circular cross-section having a diameter which is slightly greater than the diameter defined by the respective cylindrical body portions 30, 32 of the end plates 12, 14. The end plates 12, 14 are aligned with the locking ring 16 in a manner to allow telescopic mating of the cylindrical body portions 30, 32 with the locking ring 16. The locking ring 16 also includes an annular body 60, which is preferably an upset forging of AISI 4340 alloy steel. A ductile safety ring 62 may be formed about the body 60. In FIG. 2, the safety ring 62 is shown as being formed from a single layer of material. Alternatively, the safety ring 62 may comprise a plurality of layers of a ductile material. The material of the safety ring 62 must be ductile to readily deform and trap, in the event of failure, members or pieces of members of the device 10 which are expulsed radially outwardly from the device 10. Preferably, AISI 304 annealed stainless shimstock is used to form the safety ring 62. Additionally, the safety ring 62 may be formed with a height which is substantially equal to the height of the locking ring 16, or, alternatively, a plurality of safety rings 62 may be used which are axially spaced along the length of the locking ring 16, as shown in FIG. 2. FIG. 2 only shows the use of two separate safety rings 62, but any number of the safety rings 62 may be employed with the subject invention. In the embodiments of the invention which utilize a plurality of safety rings 62, strain gauges 64 may be mounted to the outer surface of the body 60 in the spaces defined by each pair of the safety rings 62. The strain gauges 64 may be used to measure the circumferential expansion of the body 60 during operation of the device 10, and a comparison, using techniques known by those skilled in the art, may be made of theoretical calculations of circumferential expansion and actual circumferential expansion in determining frictional effects upon the device 10. An aluminum shell 66 is provided about the exterior of the locking ring 16. As shown in FIG. 1, sight holes 68 may be formed through the shell 66 which provide access for mounting the strain gauges 64 to the body 60 and provide pathways for the wiring of the respective strain gauges 64. Handles 70 may be mounted to the exterior surface of the thermoplastic shell 66 which allow for easy handling of the locking ring 16.

Preferably, as shown in FIG. 2, the device 10 is operated in a generally vertical alignment. An elastomeric member 72 is disposed between the lower end of the locking ring 16 and the lower end plate 14. Preferably, the elastomeric member 72 is an O-ring with an inner diameter greater than the diameter defined by the cylindrical body portion 32, but the elastomeric member may be comprised of a plurality of discontinuous elastomeric units circumferentially spaced about the cylindrical body portion 32. With the elastomeric member 72, the locking ring 16 may be axially spaced from the lower end plate 14. Furthermore, with the upper end plate 12 being in pressing contact with the pressing members, described below, the upper end plate 12 is also axially spaced from the locking ring 16. Accordingly, the locking ring 16 is unconstrained by the end plates 12, 14 and is provided with an allowable range of angular movement relative to the longitudinal axis of the device 10.

A plurality of pressing members is disposed between the end plates 12, 14 and within the locking ring 16. The pressing members collectively define a right cylinder form generally having the dimensions of the volume encompassed by the inner surface 58 of the locking ring 16. The pressing members include eight peripheral pressure transmitting members represented by the reference numerals 74, 76, 78, 80, respectively, with four of the members adjacent each of the end plates 12, 14. As shown in FIGS. 5A–C, each of the peripheral pressure transmitting members 74, 76, 78, 80 is formed with a planar bottom surface 82, a curved outer surface 84 and a planar pressure transmitting surface 86. Each of the curved outer surfaces 84 is formed with a radius of curvature which substantially corresponds to the radius of curvature of the inner surface 58 of the locking ring 16. Also, the outer surfaces 84 encompass an arc which is slightly less than one quarter the circumference defined by the inner surface 58. Thus, the peripheral pressure transmitting members 74, 76, 78, 80 may be circumferentially spaced about the respective adjacent end plate 12, 14 with the curved outer surfaces 84 being in pressing contact with the inner surface 58 and the bottom surfaces 82 in pressing contact with the respective adjacent end plate 12, 14. With the device 10 being assembled, the respective planar pressure transmitting surfaces 86 are facing the center of the device 10. Preferably, each pair of the planar bottom surfaces 82 and the planar pressure transmitting surfaces 86 defines an acute angle $\alpha$, which measures 45°.

A central pressure transmitting member 98, 100 is located centrally between each set of the peripheral pressure transmitting members 74, 76, 78, 80. The central pressure transmitting members 88, 90 are each formed with a generally parallelepiped shaped body 92 which has an outer surface 94 in pressing contact with the respective adjacent end plate 12, 14, and an inwardly facing inner surface 96. Preferably, a groove 98 is formed in the periphery of the body 92 intermediate the outer surface 94 and the inner surface 96. A spacer 100 is fixed within the groove 98 which serves at least two purposes. First, the spacer centrally locates the body 92 of the respective central pressure transmitting member 88, 90 relative to the respective end plate 12, 14 and the respective set of peripheral pressure transmitting members 74, 76, 78, 80. Second, the spacer 100 may be formed from a material which is substantially electrically non-conductive, thereby resulting in the central pressure transmitting members 88, 90 being electrically insulated from the adjacent pressing members. In this manner, electrical flow can be introduced to the sample vessel through the central pressure transmitting members 88, 90. Alternatively, the central pressure transmitting members 88, 90 can be formed without the grooves 98, with insulative material being disposed about the respective central pressure transmitting members 88, 90.

An anvil 102 extends from the inner surface 96 of both of the central pressure transmitting members 88, 90. Each of the anvils 102 has a free end 104 which has a square shape with dimensions which correspond to one face of the cubic sample vessel, as described below. The body 106 of each of the anvils 102 defines a cross-section which is dimensionally greater than the respective free end 104. The body 106 is shown in the FIGS. as having a cylindrical shape, but may be formed with any cross-section, so long as it is dimensioned greater than the respective free end 104. Chamfered surfaces 108 extend from the periphery of the free end 104 to the periphery of the cross-section of the body 106. The anvils 102 are preferably formed from tungsten carbide.

The pressing members also include four pressure receiving members 110 located between the two sets of peripheral pressure transmitting members 74, 76, 78, 80. Each of the pressure receiving members is formed with a planar first face 112, which generally faces the center of the device 10, a planar second face 114, and a planar third face 116. Each pair of the second faces 114 and the third faces 116 defines a dihedral angle therebetween, which preferably measures 9°. In assembling the device 10, the two sets of the peripheral pressure transmitting members 74, 76, 78, 80 are axially aligned in pairs with a single of the pressure receiving members 110 being disposed between each of the pairs. The second faces 114 and the third faces 116 are in pressing contact with the pressure transmitting surfaces 86 of the respective adjacent peripheral pressure transmitting members 74, 76, 78, 80. To ensure pressing contact between these various surfaces, the dihedral angles defined by each pair of the second faces 114 and the third faces 116 must be approximately twice as great as the acute angles α defined by the peripheral pressure transmitting members 74, 76, 78, 80. As shown in FIG. 2, the peripheral pressure transmitting members 74, 76, 78, 80 are truncated with a planar portion 118 extending between the respective curved surface 84 and the pressure transmitting surface 86. The planar truncations 118 define axial clearance between each pair of vertically aligned peripheral pressure transmitting members 74, 76, 78, 80. Also, the pressure receiving members 110 are disposed within the device 10 to define radial clearances therebetween.

One of the anvils 102, having the structure described above, extends from each of the first faces 112 of the respective pressure receiving members 110. The free ends 104 of the anvils 102 collectively define a cuboidal volume centrally located within the device 10 for accommodating the sample vessel, described below. The anvils 102 are dimensioned and located such that the chamfered surfaces 108 define clearances between each pair of the adjacent anvils 102. During the life of the device 10, one or more of the anvils 102 may need to be replaced. To ensure accurate alignment of the anvil 102 relative to the respective pressing member, the anvil 102 is formed with a generally rectangular shaped plate 120 which peripherally extends from the base of the body 106. The plate 120 may be formed from aluminum and heat shrunk onto the body 106 of the anvil 102. A plurality of apertures 122 is formed through the plate 120. Correspondingly, a plurality of apertures 124 is formed in the respective pressing member which supports the anvil 102. The anvil 102 may be mounted to the respective member by aligning the two pluralities of apertures 122 and 124, and securing the plate 120 to the respective member using screws, or any other conventional method known to those skilled in the art.

Since substantial friction is generated during the operation of the device 10, although not shown, friction reducing medium may be disposed between the surfaces which are in pressing contact. Thermoplastic film, such as Mylar, may be used to reduce the generation of frictional forces between pressing-contact surfaces and, yet, allow transmission of pressure and forces therethrough. Additionally, the thermoplastic film may provide electrical isolation of each pair of adjacent pressure transmitting members to allow for mounting of instrumentation to measure various characteristics relative to three coordinate axes.

A cubic sample vessel 126 is provided to house a sample intended for testing within the device 10. Referring to FIG. 2, the sample vessel 126 is formed with an outer shell 128, which is preferably formed from the castable ceramic zirconia. A tubular hollow chamber 130 is located centrally within the sample vessel 126 for accommodating the test sample. A heater medium may be disposed within a void 132 defined between the sample vessel 126 and the chamber 130. In the preferred embodiment of the subject invention, the heater material is lanthanum chromite. It is preferred that the lanthanum chromite be pressed formed from powder to define a heating element for the invention. Using techniques known by those skilled in the art, a flow of electricity is introduced to the sample vessel 126, through selective pressing members, which charges the lanthanum chromite and causes the lanthanum chromite to heat up.

As shown in FIG. 2, the edges of the sample vessel 126 may be chamfered. The chamfered edges of the sample vessel 126 will restrict the extrusion of the zirconia comprising the sample vessel 126 between the anvils 102. If the sample vessel 126 is to be submitted to pressures in excess of the compressive strength of tungsten carbide, the edges of the sample vessel 126 may be formed with peripherally extending fins, rather than being chamfered. The fins would extend from the sample vessel 126 into the clearance defined between each pair of the adjacent anvils 102.

As is readily apparent, numerous modifications and changes may readily occur to those skilled in the art, and hence it is not desired to limit the invention to the exact construction and operation shown and described. Accordingly, all suitable modification equivalents may be resorted to falling within the scope of the invention as claimed.

I claim:

1. A multi anvil device for converting a uniaxial force applied to said device into substantially hydrostatic pressure conditions acting on a cubic sample vessel, the uniaxial force being generated by a press having a first pressure plate and a second pressure plate, said device being disposed between the pressure plates, said device comprising:

a generally disc-shaped first end plate having a planar outer surface in pressing contact with the first pressure plate;

a generally disc-shaped second end plate having a planar outer surface in pressing contact with the second pressure plate;

a tubular locking ring disposed between said end plates, said locking ring having a longitudinal axis generally perpendicular to the planes defined by both said end plates, said locking ring having an inner surface encompassing the volume of a right cylinder, said locking ring being axially spaced from at least portions of both said end plates, and wherein each said end plate includes a body having a planar first end and a planar second end, said first end generally facing the other said end plate, said second end being coextensive with said outer surface, said ends being spaced apart in a substantially parallel relationship, said first end having a circular shape with a diameter less than the diameter defined by the inner surface of said locking ring, said body having a cylindrical portion extending from said first end towards said second end which cross-sectionally defines the same diameter as said first end, and said second end being formed with dimensions greater than said first end, wherein said end plates are aligned with said locking ring to allow the respective cylindrical portions of said end plates to telescopically mate with said locking ring; and a plurality of unconstrained pressing members being disposed between said end plates and within said locking ring, said pressing members being formed to cooperatively define a right cylinder form substantially having the dimensions of the volume encompassed by said inner surface of said locking ring, said plurality of unconstrained pressing members also cooperatively defining a generally cuboidal hollow center within said right cylinder form for accommodating the cubic sample vessel, and said pressing members being formed to collectively reduce the volume of said hollow center with at least one of the pressure plates applying uniaxial force to at least one of said end plates such that said device is uniaxially compressed between the pressure plates.

2. A device as in claim 1, wherein said locking ring is axially spaced from portions of said end plates formed with dimensions greater than said cylindrical portions.

3. A device as in claim 2, wherein said pressing members includes:

a first plurality of pressure transmitting members in pressing contact with said first end of said first end plate, said first pressure transmitting members being disposed within said locking ring;

a second plurality of pressure transmitting members in pressing contact with said first end of second end plate, said second pressure transmitting members being disposed in said locking ring; and a plurality of pressure receiving members disposed between said first and said second pressure transmitting members.

4. A device as in claim 3, wherein at least one of said first pressure transmitting members partially defines said cuboidal hollow center, and wherein at least one of said second pressure transmitting members partially defines said cuboidal hollow center.

5. A device as in claim 4, wherein a portion of each of said pressure receiving members partially defines said cuboidal hollow center.

6. A device as in claim 5, wherein each of said pressure transmitting members not partially defining said cuboidal hollow center is formed with a substantially planar first surface, a curved second surface extending from said first surface, and a third surface spaced from said first surface, said second surface defining a radius of curvature substantially equal to the radius of curvature of said inner surface of said locking ring, said second surface being generally perpendicular to said first surface, said third surface being spaced from said first surface in the same direction as said second surface extends from said first surface, said third surface being disposed to define an acute angle with said first surface, said acute angle facing said second surface, wherein said first surface is disposed in pressing contact with said first end of a single said end plate, and said second surface is disposed in pressing contact with a portion of said inner surface of said locking ring.

7. A device as in claim 6, wherein said acute angle measures approximately 45°.

8. A device as in claim 6, wherein each of said pressure transmitting members which partially define said cuboidal hollow center is formed with a generally parallelepiped shaped body having opposing first and second surfaces, said first surface being in pressing contact with said first end of a single said end plate, said second surface being provided with an anvil having a free end and a mounting end, said mounting end being in abutting contact with said second surface, said free end being formed with a generally square shape substantially corresponding to the dimensions of a single face of the cubic sample.

9. A device as in claim 8, wherein each of said pressure transmitting members which partially define said cuboidal hollow center is formed with transverse spacing means intermediate said first and said second surfaces, said transverse spacing means for preventing abutting contact between said respective pressure transmitting member and adjacent said pressure transmitting members.

10. A device as in claim 9, wherein said transverse spacing means is substantially electrically non-conductive.

11. A device as in claim 8, wherein each of said pressure receiving members disposed between said pressure transmitting members is formed with a polyhedral body having a planar first face with spaced, generally parallel first and second edges, a second face extending from said first edge, a third face extending from said second edge, said second face and said third face being both obliquely disposed relative to said first face such that said second face and said third face intersect to form a dihedral angle therebetween, wherein said second face and said third face being each in pressing contact with said third surface of a single said pressure transmitting member.

12. A device as in claim 11, wherein said dihedral angle measures approximately 90°.

13. A device as in claim 11, wherein each of said pressure receiving members is provided with an anvil extending from said first face, said anvil having a free end and a mounting end, said mounting end being in abutting contact with said first face, said free end being formed with a generally square shape substantially corresponding to the dimensions of a single face of the cubic sample.

14. A device as in claim 13, wherein said anvils are each formed with a substantially planar plate extending peripherally from said mounting end, each said planar plate having a plurality of apertures formed therethrough.

15. A device as in claim 14, wherein each said pressure receiving member is formed with a plurality of apertures corresponding to said plurality of apertures formed in said plate of said respective anvil, wherein alignment of both said pluralities of apertures allows for alignment of said respective anvil relative to said pressure receiving member.

16. A device as in claim 14, wherein each of said pressure transmitting members which partially define said cuboidal hollow center is formed with a plurality of apertures corresponding to said plurality of apertures formed in said plate of said respective anvil, wherein alignment of both said pluralities of apertures allows for alignment of said respective anvil relative to said pressure transmitting member.

17. A device as in claim 15, wherein a plurality of screws is provided to pass through said apertures in said plate of said anvils and threadedly engage said apertures formed in said pressure receiving members.

18. A device as in claim 16, wherein a plurality of screws is provided to pass through said apertures in said plate of said anvils and threadedly engage said apertures formed in said pressure transmitting members.

19. A device as in claim 1, wherein cooling means are provided in said end plates for cooling said pressing members in pressing contact with said end plates along circular paths at various radial locations.

20. A multi anvil device for converting a uniaxial force applied to said device into substantially hydrostatic pressure conditions acting on a cubic sample vessel, the uniaxial force being generated by a press having a first pressure plate and a second pressure plate, said device being disposed between the pressure plates, said device comprising:

a first end plate having a planar outer surface in pressing contact with the first pressure plate;

a second end plate having a planar outer surface in pressing contact with the second pressure plate;

a tubular locking ring disposed between said end plates, said locking ring having a longitudinal axis generally perpendicular to the planes defined by both end plates, said locking ring being axially spaced from both said end plates, said locking ring having an inner surface encompassing the volume of a right cylinder;

a plurality of annular-shaped safety rings disposed about said locking ring, said safety rings being axially spaced and formed from ductile material;

circumferential expansion means provided in between at least two of said safety rings for measuring circumferential expansion of said locking ring during compression of the multi anvil device; and a plurality of pressing members being disposed between said end plates and within said locking ring, said pressing members being formed to cooperatively define a right cylinder form substantially having the dimensions of the volume encompassed by said inner surface of said locking ring, said plurality of pressing members also cooperatively defining a generally cuboidal hollow center within said right cylinder form for accommodating the cubic sample vessel, and said pressing members being formed to collectively reduce the volume of said hollow center with at least one of the pressure plates applying uniaxial force to at least one of said end plates such that said device is uniaxially compressed between the pressure plates.

21. A device as in claim 20, wherein at least one elastomeric member is disposed between at least one said end plate and said locking ring.

* * * * *